(12) United States Patent
Olgaard et al.

(10) Patent No.: US 8,774,024 B2
(45) Date of Patent: Jul. 8, 2014

(54) ACHIEVING GREATER TEST EFFICIENCIES USING ACK SIGNAL SUPPRESSION

(75) Inventors: Christian Volf Olgaard, Saratoga, CA (US); Ruizu Wang, San Ramon, CA (US)

(73) Assignee: Litepoint Corporation, Sunnyvale, CA (US)

( * ) Notice: Subject to any disclaimer, the term of this patent is extended or adjusted under 35 U.S.C. 154(b) by 492 days.

(21) Appl. No.: 12/943,237

(22) Filed: Nov. 10, 2010

(65) Prior Publication Data

US 2012/0113829 A1 May 10, 2012

(51) Int. Cl.
*H04L 12/26* (2006.01)

(52) U.S. Cl.
USPC ........... 370/252; 370/259; 370/230; 370/474; 370/349; 370/334; 455/456.1; 455/432.1; 455/446

(58) Field of Classification Search
CPC ...... H04L 47/10; H04L 43/50; H04L 12/5695
USPC ......... 370/252, 259, 230, 474, 349, 334, 302; 455/456.1, 432.1, 446
See application file for complete search history.

(56) References Cited

U.S. PATENT DOCUMENTS

| | | | |
|---|---|---|---|
| 4,833,676 A | 5/1989 | Koo | |
| 4,897,842 A | 1/1990 | Herz | |
| 5,138,608 A | 8/1992 | Kucera et al. | |
| 5,910,977 A | 6/1999 | Torregrossa | |
| 6,753,693 B2 | 6/2004 | Seo et al. | |
| 6,870,392 B2 | 3/2005 | Kilian et al. | |
| 6,986,086 B2 | 1/2006 | Scholten | |
| 7,057,518 B2 | 6/2006 | Schmidt | |
| 7,463,140 B2 | 12/2008 | Schmidt | |
| 7,564,893 B2 | 7/2009 | O'Neill | |
| 7,890,822 B2 | 2/2011 | Behziz et al. | |
| 2003/0142666 A1 | 7/2003 | Bonney et al. | |
| 2004/0023665 A1* | 2/2004 | Simmonds et al. | ........ 455/456.1 |

FOREIGN PATENT DOCUMENTS

WO WO2009-023516 A1 2/2009

OTHER PUBLICATIONS

International Search Report and Written Opinion for PCT Appl. No. PCT/US2011/051528 mailed Feb. 9, 2012; 9 pages.

* cited by examiner

*Primary Examiner* — Jamal Javaid
(74) *Attorney, Agent, or Firm* — Vedder Price, P.C.

(57) ABSTRACT

A method and system for testing a wireless data packet transceiver as a device under test (DUT) adapted to operate in conformance with a wireless signal standard such that a transmitted signal, when received by an intended receiver, is to result in a responsive signal transmission acknowledging such signal reception. During testing, responsive signal transmissions, e.g., acknowledgement signals, are withheld by the test system until after a predetermined number of data packets have been captured from the DUT, until a predetermined time interval has passed, or until data packets at a predetermined number of data rates have been captured from the DUT.

20 Claims, 7 Drawing Sheets

ACHIEVING GREATER TEST EFFICIENCIES USING ACK SIGNAL SUPPRESSION

BACKGROUND OF THE INVENTION

1. Field of the Invention

The present invention relates to systems and methods for testing wireless devices using test platforms consisting of hardware, firmware and software components.

2. Related Art

Many modern devices utilize wireless signals to send and receive data. Handheld devices in particular make use of wireless connections to provide features including telephony, digital data transfer, and geographical positioning. Although a variety of different wireless-connectivity capabilities are used (such as WiFi, WiMAX, and Bluetooth), in general each is defined by an industry-approved standard (such as IEEE 802.11, IEEE 802.16 and IEEE 802.15, respectively). In order to communicate using these wireless-connectivity capabilities, devices must adhere to the parameters and limitations specified by the associated standards.

Although differences exist between wireless communication specifications (for example, in the frequency spectra, modulation methods, and spectral power densities used to send and receive signals), almost all of the wireless connectivity standards specify the use of synchronized data packets to transmit and receive data. Furthermore, most devices adhering to these wireless communications standards employ transceivers to communicate; that is, they transmit and receive wireless radio frequency (RF) signals.

At any point along the device-development continuum, it may be necessary to test and verify that a device is operating according to the standards associated with its various communication capabilities. Specialized systems designed for testing such devices typically contain subsystems operative to communicate with a wireless communications device during a test. These subsystems are designed to test that a device is both sending and receiving signals in accordance with the appropriate standards. The subsystems must receive and analyze device-transmitted signals and send signals to the device that subscribe to industry-approved standards.

The testing environment generally consists of the device under test (DUT), the tester, and a computer. The tester is generally responsible for communicating with the DUT using a particular wireless communication standard. The computer and tester work together to capture a DUT's transmitted signals and then analyze them against the specifications provided by the underlying standard to test the DUT's transmission capabilities.

As is well known in the art, the time required to test a device has a linear relationship with the cost associated with conducting the test. Therefore, it is advantageous to reduce the amount of time required by a test, thereby increasing the throughput of each test system and lowering overall production costs. Several factors contribute to the total time required to test a device. These factors include the time spend handling a device, setting up the test, sending control signals from the tester to the device, capturing signals sent by the device, and analyzing those captured signals. Time spent sending control signals to the device can make up a proportionately large contributor to the overall test time. Furthermore, these control signals are not directly involved in capturing, measuring, or evaluating signals from the device. As such, this is a ripe area for innovation.

Despite the advantages gained by reducing overall test time, the accuracy and validity of a test cannot be compromised. At a minimum, doing so would increase the rate of retesting necessary to evaluate a device, causing a proportionate rise in the total time required for testing. As such, methods for decreasing the time required to perform a test without eliminating necessary steps or compromising the integrity of the test are desired.

SUMMARY OF THE INVENTION

In accordance with the presently claimed invention, a method is provided for controlling a wireless data packet transceiver device under test (DUT) such that the DUT transmits data packets for capture and testing of their transmission quality(ies) more quickly.

In accordance with one embodiment of the present invention, the number of control commands necessary to perform a test can be reduced by suppressing the acknowledgment packets normally otherwise sent by the tester to indicate successful capture of a good packet. Doing so forces a DUT to continue transmitting the same packet until it either receives an acknowledgment or times out.

In accordance with another embodiment of the present invention, by suppressing acknowledgment packets from a tester, a DUT can be forced to repeat transmission of a given packet, e.g., at successively lower data rates, until it either times out or receives an acknowledgment packet.

In accordance with another embodiment of the present invention, a method is provided for selecting one or more of a plurality of packets for capture and analysis based on packet duration.

In accordance with another embodiment of the present invention, a method is presented for filtering packets based on a plurality of packet characteristics such that only desired packets are captured and analyzed. Packet characteristics can include, but are not limited to, packet length, origin, context (e.g., what packets are received prior and subsequent to a particular packet) and content.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
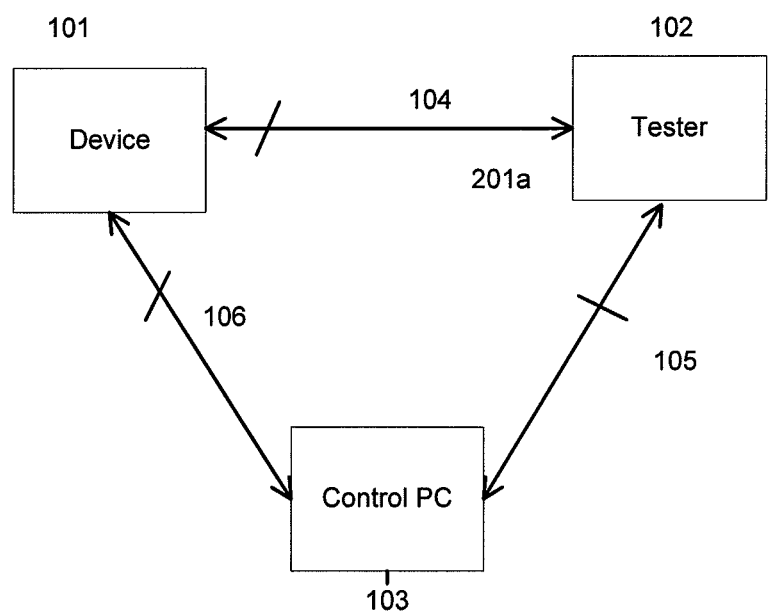
FIG. 1 is a functional block diagram of a conventional test environment for testing a wireless device.

Referring to FIG. 1, a conventional test system for testing a wireless standard would include a device-under-test (DUT) 101, a tester 102, and a computer (PC) controller 103 that executes the test program and coordinates the operation of the DUT 101 and the tester 102. They are linked by bidirectional communications pathways 104, 105, 106 that can be any form of communications link (e.g., Ethernet, universal serial bus (USB), serial peripheral interface (SPI), wireless interfaces, etc.). These interfaces 104, 105, 106 may be composed of one or more data channels. For example, interface 104 could be a multiple input, multiple output (MIMO) type link (e.g., as in the IEEE 802.11n wireless standard) or a single input, single output (SISO) type link (e.g., as in the IEEE 802.11a wireless standard). Other possible communications links will be clear to one of ordinary skill in the art. In such a system, the tester 102 sends test signals to the DUT 101 over a bidirectional interface 104. The DUT 101 will also transmit signals to the tester 102 using the same bidirectional interface 104. The control computer 103 executes a test program and coordinates the operation of the DUT 101 and tester 102 via interfaces 105 and 106.

As will be readily appreciated by one of ordinary skill in the art, the signal interface 104 between the DUT 101 and the tester can be an over-the-air (wireless) connection or a wired connection (e.g., a cable) using the circuit interface for connecting to the antenna(s). Often, for testing purposes, such wired connections are used to ensure signal consistency.

Figure 2:
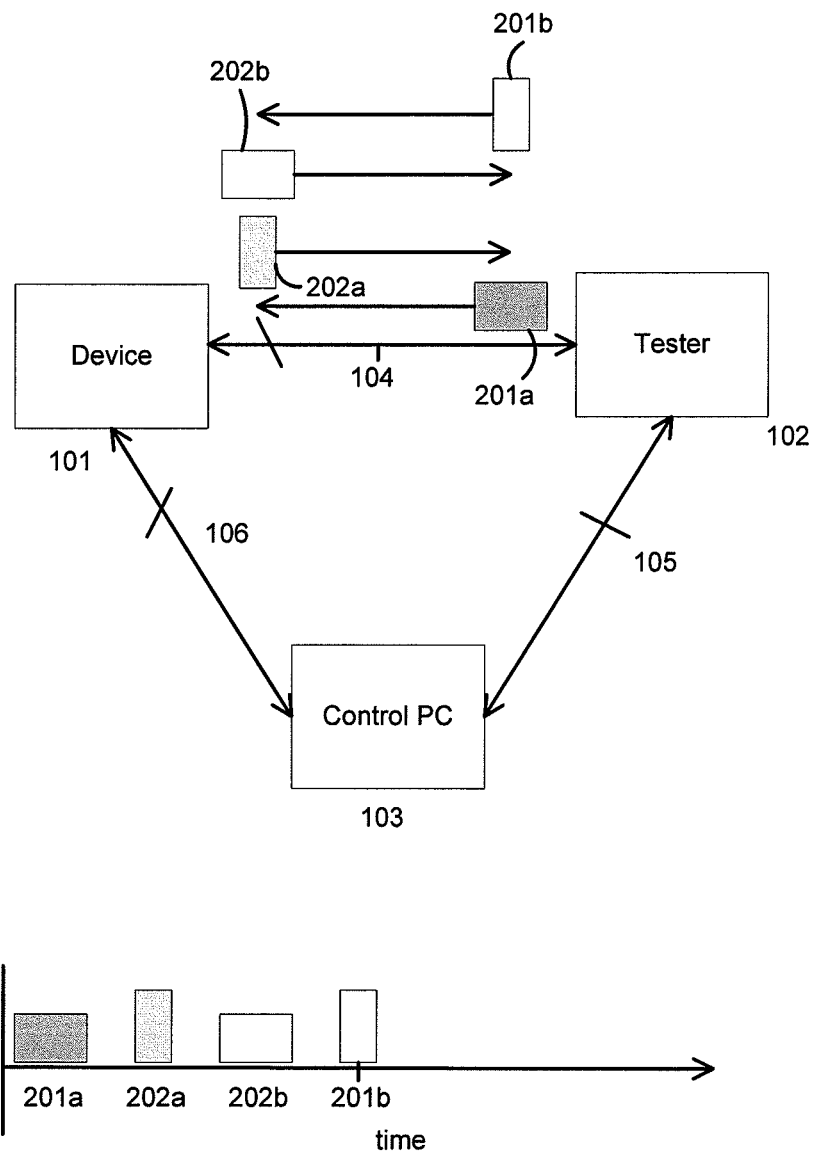
FIG. 2 is a diagram and timeline of a conventional method for testing a wireless device test consistent with the testing environment of FIG. 1.

Referring to FIG. 2, a method for conducting a conventional test carried out on a variation of the system shown in FIG. 1 is shown. This test could be, by way of example, validating the DUT 101 against a wireless communications standard such as (but not limited to) IEEE 802.11. One example of such a test would be one device transmitting a ping command to a second device. A ping command instructs the receiving device to transmit back a reply packet consisting of an exact copy of the data received in the packet containing the ping command. Although the reply packet is most often sent with the same signal characteristics as the packet containing the ping command, in some cases a reply packet will be transmitted at a different data rate. This results in a reply packet with a different duration than the original ping command packet while still containing identical data. (Discussion herein of use of a ping command is for purposes of providing an example. It will be readily appreciated by one of ordinary skill in the art that other commands can be used in practicing the presently claimed invention.) The benefit of this type of testing is minimal control signals are required to be communicated via the PC-DUT interface 106.

During conventional testing, reception of any data packet is responded to by transmitting an acknowledgment signal (ACK). For example, should a device receive a command, it will first transmit an ACK before transmitting its response packet(s). The ACKs serve as confirmation that a data packet was received correctly. An ACK takes the form of a packet and as it does not typically contain an identical copy of the information received in a data packet, since it is intended to merely acknowledge receipt of the command, it is generally much shorter in duration than a response packet to a command. The specific structure of an ACK packet and the protocol for which packets require acknowledgment is given by the particular wireless communications standard being tested. (Although the IEEE 802.11 communication protocol is discussed extensively in relation to the present invention throughout the disclosure, it will be understood that the present invention is applicable to any communication standard that utilizes any form of acknowledgement signal.)

The method shown in FIG. 2 begins when a packet 201a containing a ping command is transmitted from the tester 102 to the DUT 101 over communication link 104. Upon reception of the packet 201a, the DUT 101 responds first with an ACK in the form of a packet 202a. The DUT 101 then further responds with a response packet 202b, containing an exact copy of the data received in packet 201a. Upon reception of the response packet 202b, the tester 102 responds with an ACK in the form of a packet 201b. In this way, the reception of any packet that is not an ACK packet results in the transmission of an ACK packet in reply. As can be seen on the timeline shown below FIG. 2, the total delay time, or time spent neither transmitting nor receiving a packet, increases linearly with the number of packets sent. Additionally, at least in the case of a ping command, every data packet sent by the DUT 101 (such as response packet 202b) requires the transmission of a packet 201a.

Figure 3:
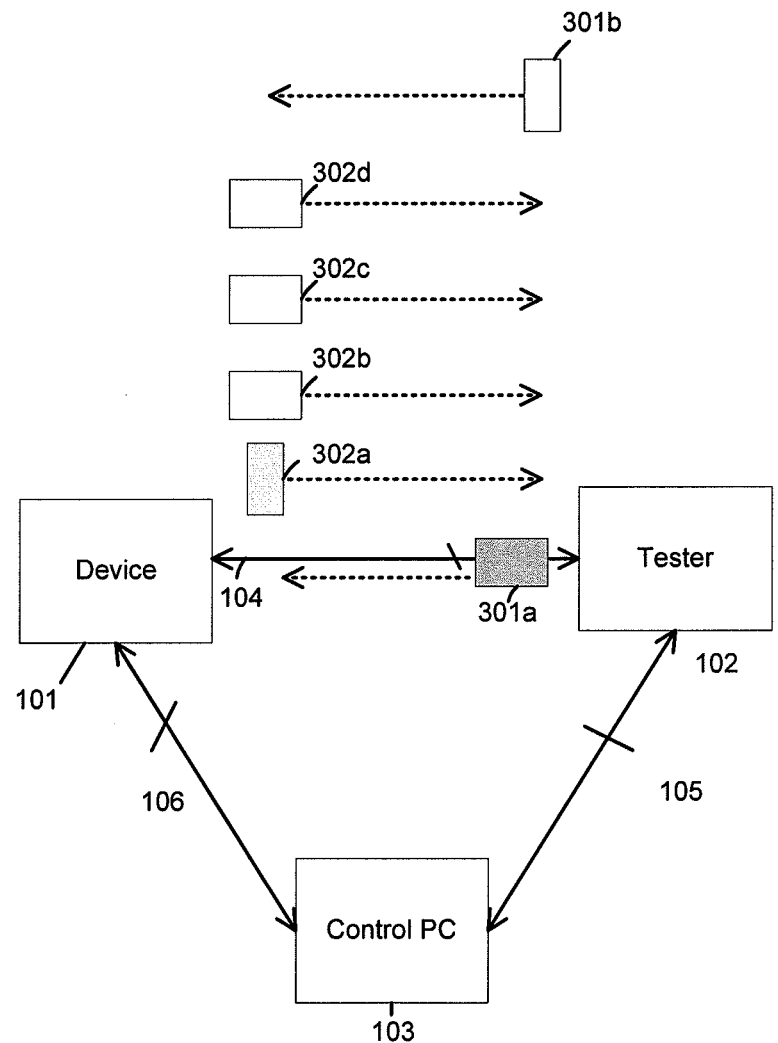
FIG. 3 is a diagram and timeline depicting a method for testing a wireless device in accordance with an embodiment of the present invention whereby an acknowledgment signal from the tester is suppressed, causing the DUT to continue transmitting packets.
Figure 3:
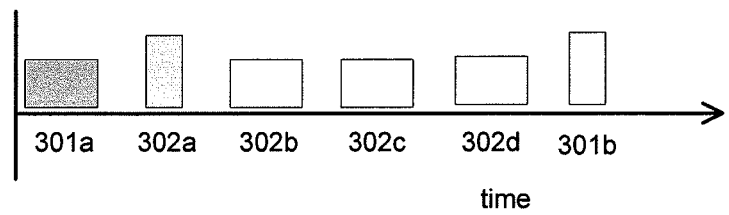

Referring to FIG. 3, an embodiment of the present invention is shown. Testing can occur on a system similar to that depicted in FIG. 1. Here, by way of example, the IEEE 802.11 wireless standard is being tested. In other words, the communication link 104 between the DUT 101 and the tester 102 is formed in accordance with the IEEE 802.11 wireless specification. (It will be readily appreciated that testing in accordance with the presently claimed invention can be done based upon other wireless standards as well) Testing begins with the tester 102 sending a packet 301a, e.g., containing a ping command. Upon receiving the packet 301a, and detecting it as a valid packet, the DUT 101 transmits both an ACK in the form of a packet 302a and a response packet 302b. However, notwithstanding capturing and detecting the response packet 302b as a valid packet, the tester 102 does not immediately respond with an ACK to confirm receipt of the response packet 302b. The tester 102 can, in effect, withhold its ACK response(s) by momentarily disrupting or interrupting its communication link 104 with the DUT 101 using any of several well known techniques, including switching (e.g., opening the communication link 104) or attenuation (e.g., significantly attenuating any ACK signal(s) that would otherwise be conveyed via the communication link 104), or similar techniques. According to the IEEE 802.11 wireless specification (along with other communications specifications), if a device transmits a packet and does not receive an ACK within a certain period of time following transmission, the device must repeat transmission of the packet until either a certain amount of time passes (and the process thus "times out") or the device receives an ACK confirming the packet was correctly received. As a result, the DUT 101 transmits packets 302c and 302d that are identical to the original response packet 302b. In other words, the DUT 101 resends the response packet 302b twice. When the tester 102 receives the third response packet 302d, and detects it as a valid packet, it allows (by not disrupting or interrupting the communication link 104) transmission of an ACK in the form of packet 301b, thereby causing the DUT 101 to cease transmission. (For purposes of the discussion herein, when the tester 102 is described as receiving a packet, unless otherwise stated, it is intended to mean also that the tester 102 has captured and detected such packet as a valid packet.)

This embodiment of the present invention minimizes both the delay time between transmissions and the number of control signals (e.g., commands) that must be sent to the DUT 101, thereby significantly decreasing the time required to capture the data packets needed for analysis as part of the test. In other words, by suppressing transmission by the tester 102 of the ACK in response to a packet from the DUT 101, multiple response packets can be elicited from the DUT 101 with only a single initiating packet transmitted by the tester 102. One or more of these multiple packets from the DUT 101 can be captured for analysis by the tester 102, e.g., capturing one at a predetermined or expected reception time, capturing those packets received within a predetermined or expected reception time interval, or capturing one or more predetermined packets received within respective predetermined or expected reception time intervals. This is done without making any changes to the DUT 101, such as installing custom test firmware or transmitting special commands via the PC-DUT interface 106. Although in the present example the ACK is only suppressed for three packets, it will be readily apparent the ACK could be suppressed until any number of packets are sent, so long as the DUT 101 does not time out before the ACK is sent.

In an alternative embodiment of the present invention described below, multiple data rates can be tested using only a single command (e.g., ping). In general, a DUT 101 will always transmit at the highest possible data rate. However, when testing a particular device, it may be desirable to force communication at a data rate lower than the maximum allowed. Generally, there is no way to specify to a device a desired data rate, unless the DUT 101 is able to recognize and respond to one or more special commands for controlling data rate. Such commands, which are not commonly available, must be conveyed via the PC-DUT interface 106. This necessitates workarounds such as installing custom test firmware on the device, which requires increased set up time as the custom firmware (which, if not already available, must be designed) must be loaded into the DUT 101. An alternative provided by one embodiment of the presently claimed invention is to make use of the "auto-rate fallback" (ARF) operation defined and included as a standard feature within many wireless communications specifications. An ARF operation, included as part of the software or firmware within the DUT 101, causes the DUT 101 to transmit at successively lower data rates (e.g., one or more transmissions at one data rate, followed by one or more transmissions at a lower data rate, and so on) and takes effect under certain conditions, such as when an ACK is not received and the initial one or more packets were sent at the maximum possible data rate. As a result, it is possible to effectively cause a device to transmit at a lower data rate by suppressing ACKs.

Figure 4:
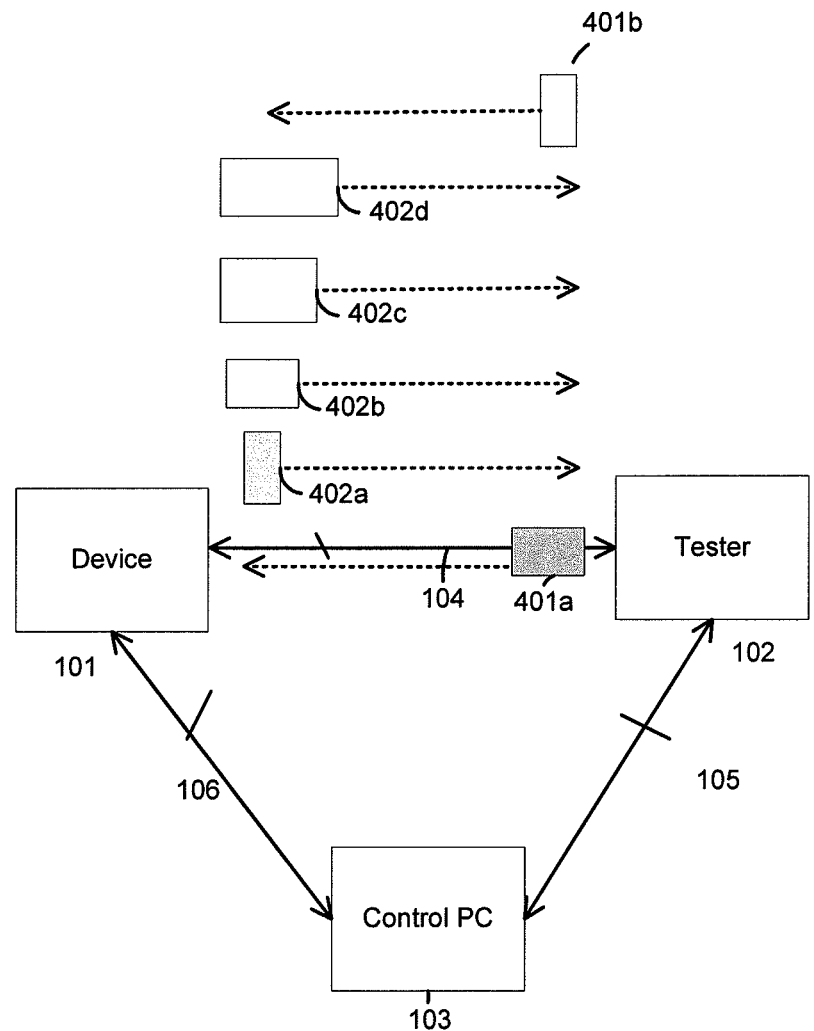
FIG. 4 is a diagram and timeline depicting a method for testing a wireless device in accordance with an embodiment of the present invention whereby an acknowledgement signal from the tester is suppressed, causing the DUT to send response packets at sequentially lower data rates.
Figure 4:
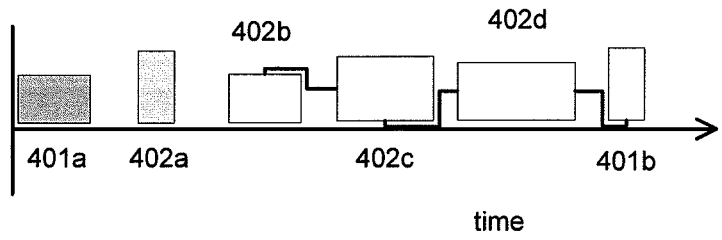

Referring now to FIG. 4, an example of the method of forcing a DUT 101 to transmit at a lower data rate by suppressing ACKs is shown. The communication link 104 between the DUT 101 and the tester 102 is formed at a high power, allowing communication to occur at a high data rate. The tester 102 begins the test by sending a ping command contained within a packet 401a, eliciting from the DUT 101 an ACK in the form of packet 402a and a response packet 402b. The tester 102 refrains from transmitting an ACK to confirm reception of the response packet 402b, e.g., by suspending ACK transmissions until a predetermined time interval has passed, until a predetermined number of data packets have been received from the DUT 101, or until data packets at a predetermined number of data rates have been received from the DUT 101. In accordance with the wireless specification being tested, the DUT 101 responds by transmitting identical copies of the response packet 402b at successively lower data rates in the form of response packets 402c and 402d. This effectively increases the duration of each subsequent reply packet without changing the packet contents. Testing concludes following reception of the response packet 402d when the tester 102 sends an ACK in the form of a packet 401b, resulting in the DUT 101 ceasing transmission.

Unlike conventional test methods, the present embodiment guarantees the DUT 101 will transmit at lower data rates per the ARF protocol included in the communication specification under test and requires no modifications to the DUT 101. By continuing to suppress the ACK from the tester 102, the DUT 101 will cycle through all of its supported data rates until it either receives an ACK or times out. This enables the testing of all the data rates supported by a DUT 101 using only a single command, and without requiring communication of any special commands via the PC-DUT interface 106.

Under some circumstances, it is desirable to analyze only particular packets transmitted by a DUT 101. For example, when testing only a certain data rate, it may be desired that only packets transmitted at that data rate be analyzed. As such, analyzing every packet transmitted by the DUT 101 add unnecessary time to the test. Furthermore, processing overhead is increased by analyzing more packets than necessary. Therefore, a method to selectively capture packets is desired.

Figure 5:
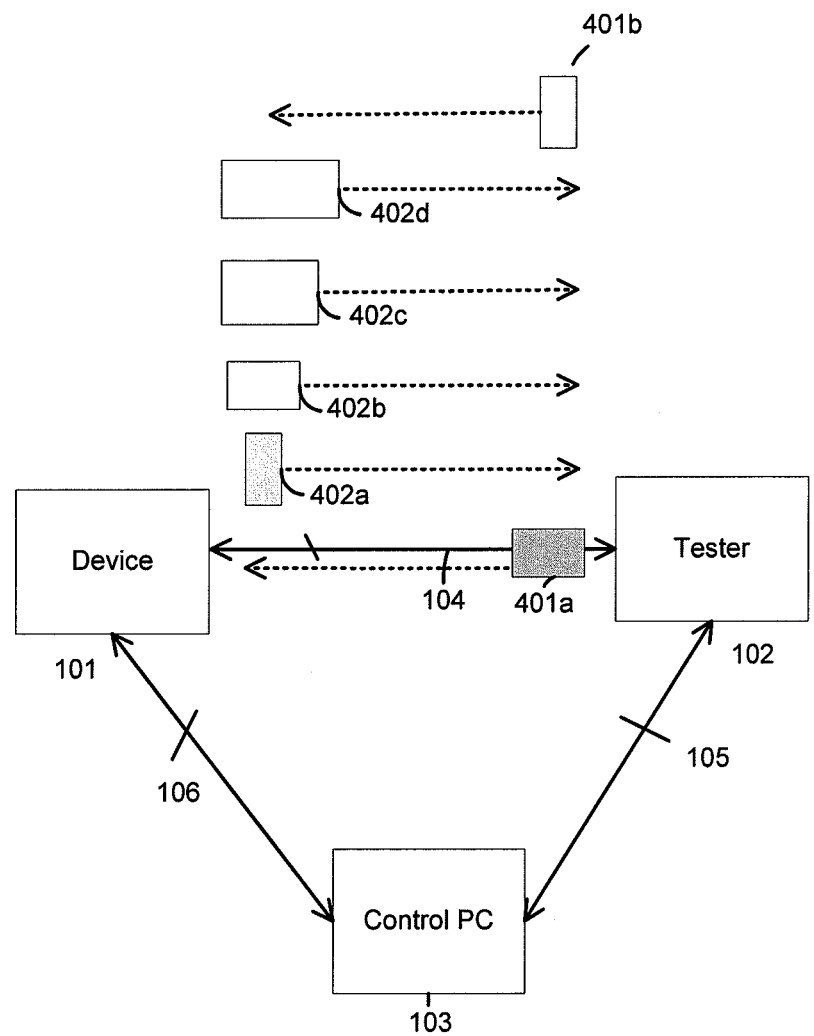
FIG. 5 is a diagram depicting a method in accordance with another embodiment of the present invention whereby packets are filtered based on duration, causing only a subset of the packets transmitted by the DUT to be captured and stored.
Figure 5:
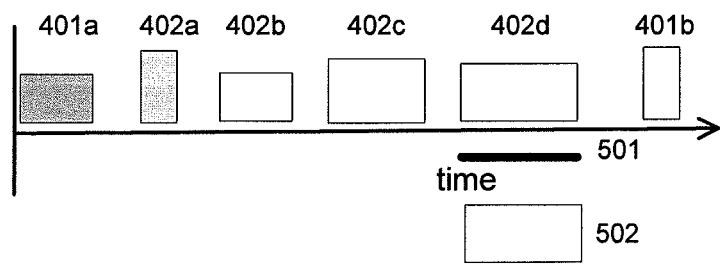

Referring to FIG. 5, a method for selectively capturing packets in accordance with an embodiment of the present invention is shown. The same test as described in FIG. 4 is carried out. However, here packets are filtered based on their data rate. As explained above in relation to FIG. 4, packets containing identical information transmitted at different data rates have different durations. As such, it is possible to select only packets of a particular data rate without decoding them by filtering packets based on duration. For example, only packets of a particular duration 501 are captured to be analyzed. An example packet 502 having the desired duration 501 is shown below the timeline. As such, only packet 402d would be captured and analyzed. As will be clear to one of ordinary skill in the art, although only a single duration is shown, other durations or signal characteristics could be used to selectively capture and analyze packets. Packets can be filtered either upon reception by the tester 102 or upon transfer to the control computer 103.

Figure 6:
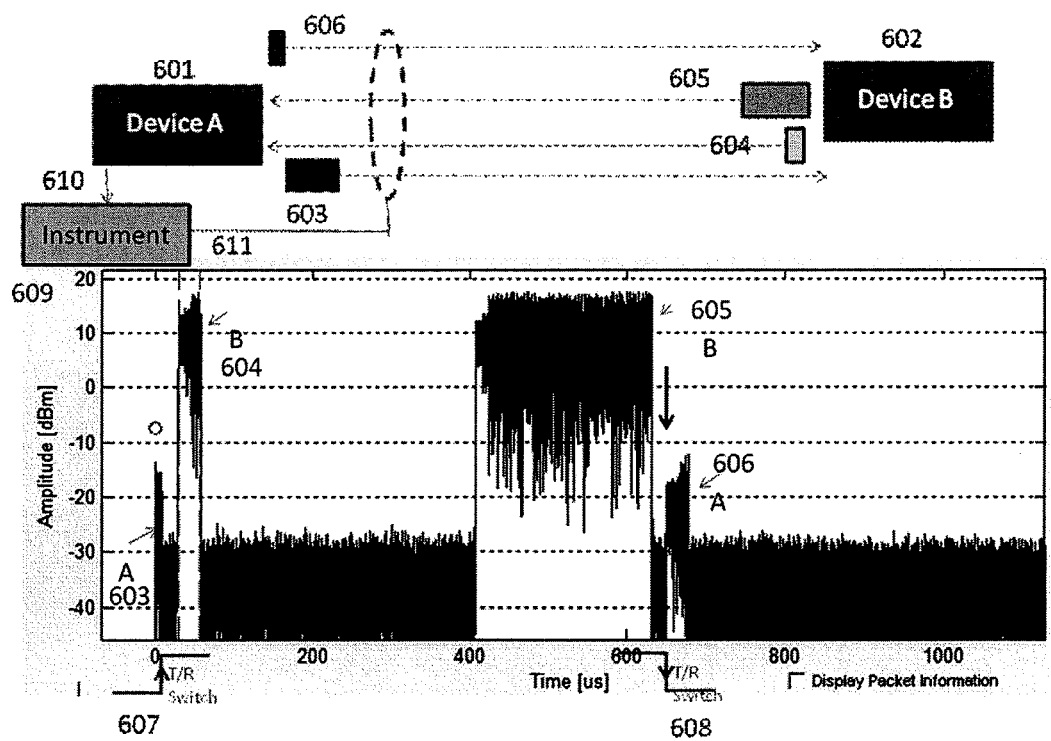
FIG. 6 is a diagram depicting a method in accordance with another embodiment of the present invention whereby a measuring instrument selectively captures packets based on their origin.

Referring to FIG. 6, a method for selectively capturing packets according to one embodiment of the present invention is shown. Here, a more generalized system for testing one or more of a plurality of communication devices is shown. In the present example, a first device 601 (Device A) and a second device 602 (Device B) communicate using a bidirectional communications link. A testing instrument 609 is coupled to Device A 601 or located nearby such that is it capable of receiving all signals that pass between Device A 601 and Device B 602 via an interface 611. Additionally, the testing instrument 609 can detect whether Device A 601 is in a transmit mode (TX) or a receive mode (RX). The testing instrument 609 is configured to detect and record one or more desired packets passing between Device A 601 and Device B 602. As will be discussed in more detail below, the instrument 609 is capable of selecting packets based on one or more of a plurality of packet characteristics. By way of example and not limitation, these packet characteristics could include packet duration, packet origin (e.g., whether the packet was sent by Device A 601 or Device B 602), packet context (e.g., which packets were transmitted before or after a particular packet), or packet contents.

Returning to FIG. 6, Device A 601, starting in transmit mode (TX), sends a packet 603 to Device B 602. After completing transmission, Device A 601 switches 607 from TX to receive mode (RX). Device B 602 performs the opposite switch such that when Device A 601 switches 607 from TX to RX, Device B 602 switches from RX to TX. As mentioned above, this switch 607 is detected by the testing instrument 609. (As noted above, this operation is based upon the use of a ping command.) After receiving the packet 603, Device B 602 sends an ACK in the form of a packet 604. After some period of time, Device B 602 then sends a packet 605. Subsequently, both Device A 601 and Device B 602 switch modes (such that Device A 601 switches 608 from RX to TX and Device B switches from TX to RX). Once again, this switch 608 is detected by the instrument 609. Finally, Device A 601 will send an ACK 606 if the packet 605 from Device B 602 is received without errors.

As mentioned above, the testing instrument 609 is capable of selectively capturing only desired packets based on a plurality of packet characteristics. One such characteristic is the origin of a packet. As the instrument 609 is capable of detecting when Device A 601 switches 607, 608 transmission modes, the instrument 609 can determine at any moment which mode Device A 601 is operating in. As such, the instrument 609 can determine the origin of any particular packet. For example, by determining that Device A 601 is in TX when a packet 606 is sent, it is possible to conclude that the packet 606 originated from Device A 601. In this manner, these switches 607, 608 can be used as a signature 610 to trigger the test instrument 609. For example, the signature 610 could trigger the instrument 609 to either start or stop searching for one or more desired packets. In one example, the instrument 609 could be triggered to only to capture packets produced by Device B 602 (such as packets 604 and 605). The instrument 609 is also capable of filtering packets based on duration, such as discussed above in reference to FIG. 5. Additionally, the instrument 609 can filter packets based on the context of the packets (e.g., which packets are sent before and after a particular packet). For example, the instrument 609 could record only every third packet of a given duration transmitted by Device B 601. Even complex capture algorithms based on a combination of several packet characteristics are possible. For example, the instrument 609 could skip the first two packets of a particular data rate, capture the third packet of that particular data rate, capture one packet of a second data rate, and capture two packets of a third data rate. Other possible combinations will be readily apparent to one of ordinary skill in the art. Additionally, the instrument 609 could further decode packets in real time and select packets to capture based on their contents.

In one embodiment, the instrument 609 can be used to monitor a communications link between two devices and capture only packets that do not result in ACK signals. Acknowledgment packets could be determined based on packet duration (e.g., acknowledgment packets are generally of a particular duration and are shorter than data packets). Packets not eliciting acknowledgement packets could then be determined based on packet context, with any packet not followed by an acknowledgment packet being captured. This could be useful, for example, during production testing as well as device/product development, as it may be indicative of malformed packets or packets which encountered interference.

Figure 7:
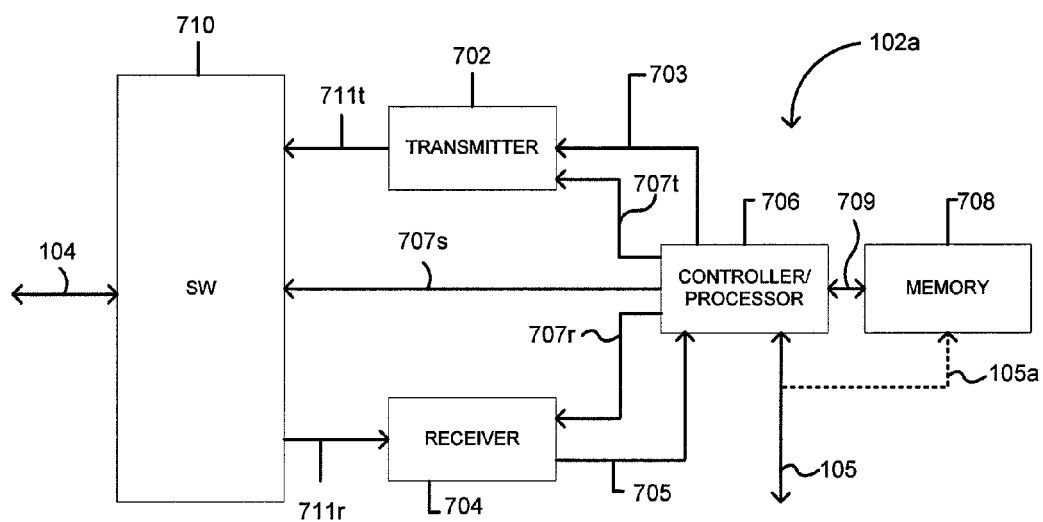
FIG. 7 is a block diagram depicting a system for testing a DUT in accordance with another embodiment of the presently claimed invention.

Referring to FIG. 7, an exemplary embodiment 102a of the tester 102 includes a transmitter 702, a receiver 704, a controller/processor 706, memory 708 and a signal router 710 (e.g., implemented as a switch or, if transmit and receive frequencies are different, a diplexor), interconnected substantially as shown. As will be readily appreciated by one of ordinary skill in the art, the transmitter 702 can be implemented as a vector signal generator (VSG), and the receiver can be implemented as a vector signal analyzer (VSA), both of which are well known in the art.

The controller/processor 706 communicates via the interface 105 with the control PC 103 (as discussed above), e.g., receiving control commands and exchanging data. The control PC 103 may also communicate directly with the memory as indicated by signal interface 105a. The controller/processor 706 and memory 708 also share a signal interface 709, e.g., for storing data in and retrieving data from the memory 708.

The controller/processor 706 provides control signals 707t for the transmitter 702, control signals 707r for the receiver 704, and control signals 707s for the signal router 710. The transmitter control signals 707t can be used for controlling how the transmitter 702 converts the outgoing data 703 to the appropriate wireless transmission signal 711t, e.g., frequency up-conversion and modulation, in accordance with well known techniques. Similarly, the receiver control signals 707r can be used for controlling how the receiver 704 converts the incoming data packet signal 711r to baseband data 705 for processing by the controller/processor 706, e.g., frequency down-conversion and demodulation, in accordance with well known techniques.

The signal router control signals 707s can be used to control the signal router 710 such that, during signal transmission, the outgoing data packet signal 711t is conveyed to the DUT interface 104, and during signal reception, the incoming data packet signal 711r is received via the DUT interface 104.

As discussed above, in accordance with commands received from the control PC 103 via the interface 105, or, alternatively, in accordance with commands stored in the memory 708, the controller/processor 706 controls the transmitter 702 and receiver 704 such that data packet signal transmission by the DUT 101 is initiated, with the resulting DUT and data packets being received while suppressing return transmission of acknowledgement signals until after a predetermined number of valid data packets have been received from the DUT, until a predetermined time interval has passed, or until valid data packets at a predetermined number of data rates have been received from the DUT 101. The memory 708 can also be used to store data packets (valid or not, as desired) received from the DUT 101 and captured by the tester 102a.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of testing a wireless data packet transceiver as a device under test (DUT) adapted to operate in conformance with a wireless signal standard such that a transmitted signal, when received by an intended receiver, is to result in a responsive signal transmission acknowledging such signal reception, comprising:

transmitting a command signal for initiating a plurality of responsive data packet transmissions by said DUT in accordance with said wireless signal standard;

capturing, following said transmitting of said command signal, a portion of said plurality of responsive data packet transmissions by said DUT in accordance with said wireless signal standard, wherein each one of said portion of said plurality of responsive data packet transmissions includes a valid data packet;

refraining from transmitting a signal responsive to said capturing of said portion of said plurality of responsive data packet transmissions by said DUT;

capturing, further following said transmitting of said command signal, one or more further portions of said plurality of responsive data packet transmissions by said DUT in accordance with said wireless signal standard, wherein each one of said one or more further portions of said plurality of responsive data packet transmissions includes a valid data packet selected based on data packet duration; and following said capturing of said one or more further portions of said plurality of responsive data packet transmissions by said DUT in accordance with said wireless signal standard, transmitting a signal acknowledging such capturing, thereby capturing, in response to said command signal, multiple portions of said plurality of responsive data packet transmissions by said DUT in accordance with said wireless signal standard, wherein said DUT transmits at least said multiple portions of said plurality of responsive data packet transmissions at a plurality of data rates.

2. The method of claim 1, wherein said refraining from transmitting a signal responsive to capturing of said portion of said plurality of responsive data packet transmissions by said DUT comprises refraining from transmitting said signal at least until a predetermined number of said plurality of responsive data packet transmissions by said DUT have been captured.

3. The method of claim 1, wherein said refraining from transmitting a signal responsive to capturing of said portion of said plurality of responsive data packet transmissions by said DUT comprises refraining from transmitting said signal at least until a predetermined time interval has passed.

4. The method of claim 1, wherein said refraining from transmitting a signal responsive to capturing of said portion of said plurality of responsive data packet transmissions by said DUT comprises refraining from transmitting said signal at least until said plurality of responsive data packet transmissions by said DUT has included a plurality of data rates.

5. The method of claim 1, wherein said capturing, further following said transmitting of said command signal, one or more further portions of said plurality of responsive data packet transmissions by said DUT comprises capturing a predetermined number of said plurality of responsive data packet transmissions by said DUT.

6. The method of claim 1, wherein said capturing, further following said transmitting of said command signal, one or more further portions of said plurality of responsive data packet transmissions by said DUT comprises capturing said plurality of responsive data packet transmissions by said DUT during a predetermined time interval.

7. The method of claim 1, wherein said capturing, further following said transmitting of said command signal, one or more further portions of said plurality of responsive data packet transmissions by said DUT comprises capturing said plurality of responsive data packet transmissions by said DUT at a plurality of data rates.

8. The method of claim 1, wherein said following said capturing of said one or more further portions of said plurality of responsive data packet transmissions by said DUT, transmitting a signal acknowledging such capturing comprises transmitting said signal acknowledging such capturing following capturing of a predetermined number of said plurality of responsive data packet transmissions by said DUT.

9. The method of claim 1, wherein said following said capturing of said one or more further portions of said plurality of responsive data packet transmissions by said DUT, transmitting a signal acknowledging such capturing comprises transmitting said signal acknowledging such capturing following a predetermined time interval.

10. The method of claim 1, wherein said following said capturing of said one or more further portions of said plurality of responsive data packet transmissions by said DUT, transmitting a signal acknowledging such capturing comprises transmitting said signal acknowledging such capturing following capturing of said plurality of responsive data packet transmissions by said DUT at a plurality of data rates.

11. A system for testing a wireless data packet transceiver as a device under test (DUT) adapted to operate in conformance with a wireless signal standard such that a transmitted signal, when received by an intended receiver, is to result in a responsive signal transmission acknowledging such signal reception, comprising:

a data packet transmitter; and
a data packet receiver;
wherein
said data packet transmitter is for transmitting a command signal for initiating a plurality of responsive data packet transmissions by said DUT in accordance with said wireless signal standard, said data packet receiver is for capturing, following said transmitting of said command signal, a portion of said plurality of responsive data packet transmissions by said DUT in accordance with said wireless signal standard, wherein each one of said portion of said plurality of responsive data packet transmissions includes a valid data packet, said data packet transmitter is further for refraining from transmitting a signal responsive to capturing of said portion of said plurality of responsive data packet transmissions by said DUT, said data packet receiver is further for capturing, further following said transmitting of said command signal, one or more further portions of said plurality of responsive data packet transmissions by said DUT in accordance with said wireless signal standard, wherein each one of said one or more further portions of said plurality of responsive data packet transmissions includes a valid data packet selected based on data packet duration, and said data packet transmitter is further for transmitting a signal acknowledging such capturing following said capturing of said one or more further portions of said plurality of responsive data packet transmissions by said DUT in accordance with said wireless signal standard, thereby capturing, in response to said command signal, multiple portions of said plurality of responsive data packet transmissions by said DUT in accordance with said wireless signal standard, wherein said DUT transmits at least said multiple portions of said plurality of responsive data packet transmissions at a plurality of data rates.

12. The system of claim 11, wherein said data packet transmitter is further for refraining from transmitting a signal responsive to capturing of said portion of said plurality of responsive data packet transmissions by said DUT at least until a predetermined number of said plurality of responsive data packet transmissions by said DUT have been captured.

13. The system of claim 11, wherein said data packet transmitter is further for refraining from transmitting a signal responsive to capturing of said portion of said plurality of responsive data packet transmissions by said DUT at least until a predetermined time interval has passed.

14. The system of claim 11, wherein said data packet transmitter is further for refraining from transmitting a signal responsive to capturing of said portion of said plurality of responsive data packet transmissions by said DUT at least until said plurality of responsive data packet transmissions by said DUT has included a plurality of data rates.

15. The system of claim 11, wherein said data packet receiver is further for capturing, further following said transmitting of said command signal, one or more further portions of said plurality of responsive data packet transmissions by said DUT by capturing a predetermined number of said plurality of responsive data packet transmissions by said DUT.

16. The system of claim 11, wherein said data packet receiver is further for capturing, further following said transmitting of said command signal, one or more further portions of said plurality of responsive data packet transmissions by said DUT by capturing said plurality of responsive data packet transmissions by said DUT during a predetermined time interval.

17. The system of claim 11, wherein said data packet receiver is further for capturing, further following said transmitting of said command signal, one or more further portions of said plurality of responsive data packet transmissions by said DUT by capturing said plurality of responsive data packet transmissions by said DUT at a plurality of data rates.

18. The system of claim 11, wherein said data packet transmitter is further for transmitting a signal acknowledging such capturing following capturing of said one or more further portions of said plurality of responsive data packet transmissions by said DUT by transmitting said signal acknowledging such capturing following capturing of a predetermined number of said plurality of responsive data packet transmissions by said DUT.

19. The system of claim 11, wherein said data packet transmitter is further for transmitting a signal acknowledging such capturing following capturing of said one or more further portions of said plurality of responsive data packet transmissions by said DUT by transmitting said signal acknowledging such capturing following a predetermined time interval.

20. The system of claim 11, wherein said data packet transmitter is further for transmitting a signal acknowledging such capturing following capturing of said one or more further portions of said plurality of responsive data packet transmissions by said DUT by transmitting said signal acknowledging such capturing following capturing of said plurality of responsive data packet transmissions by said DUT at a plurality of data rates.

* * * * *